US007254490B2

(12) United States Patent
Charlton

(10) Patent No.: US 7,254,490 B2
(45) Date of Patent: Aug. 7, 2007

(54) MARKING SYSTEM AND METHOD

(75) Inventor: Adrian Charlton, York (GB)

(73) Assignee: The Central Science Laboratory, "CSL", Representing the Secretary of State for Environment, Food and Rural Affairs, York (GB)

( * ) Notice: Subject to any disclaimer, the term of this patent is extended or adjusted under 35 U.S.C. 154(b) by 0 days.

(21) Appl. No.: 10/552,621

(22) PCT Filed: Apr. 13, 2004

(86) PCT No.: PCT/GB2004/001554

§ 371 (c)(1),
(2), (4) Date: Oct. 7, 2005

(87) PCT Pub. No.: WO2005/004016

PCT Pub. Date: Nov. 3, 2005

(65) Prior Publication Data

US 2006/0195270 A1 Aug. 31, 2006

(30) Foreign Application Priority Data

Apr. 10, 2003 (GB) .................................. 0308258.3

(51) Int. Cl.
*G01N 33/00* (2006.01)
(52) U.S. Cl. ..................... 702/22; 700/225; 702/27; 702/30
(58) Field of Classification Search ................. 700/90, 700/213, 215, 225; 702/22, 27, 30; 705/22, 705/28
See application file for complete search history.

(56) References Cited

U.S. PATENT DOCUMENTS 2,960,910 A * 11/1960 Pelavin ........................ 356/411
3,428,796 A * 2/1969 Martens et al. ............. 708/851
3,537,820 A * 11/1970 Shah et al. .................. 436/79
3,547,541 A * 12/1970 Varnela ....................... 356/306
6,767,732 B2 * 7/2004 Alocilja et al. .......... 435/287.5
2002/0094058 A1   7/2002 Kaiser et al.
2002/0119513 A1 * 8/2002 Alocilja et al. ............... 435/34
2004/0024570 A1 * 2/2004 Muehl et al. ................ 702/184
2006/0195270 A1 * 8/2006 Charlton ..................... 702/22

FOREIGN PATENT DOCUMENTS

| DE | 3934969 A1 * | 2/1991 |
|---|---|---|
| DE | 4436923 C1 | 2/1996 |
| EP | 0244094 A2 * | 11/1987 |
| FR | 2787220 A1 * | 6/2000 |
| WO | WO 02/095651 A2 | 11/2002 |

* cited by examiner

*Primary Examiner*—Edward Cosimano
(74) *Attorney, Agent, or Firm*—Jacobson Holman PLLC

(57) ABSTRACT

A methodology for facilitating the identification, authentication or quality control of packaged products is described comprising a marking and an authentication phase. In the marking phase the method involves obtaining an analytical specification, and for example an analytical spectrum, of a reference chemical composition for the product; and recording the data on a machine readable data storage means provided in direct mechanical association with the packaging thereof, and for example being incorporated into or onto or as a part of such packaging. The authentication phase comprises applying a suitable data reader to the data storage means to read the recorded data and reconstruct the recorded analytical specification; chemically analysing a sample of the product to obtain a measured analytical specification; comparing the measured and recorded readings within predetermined tolerance limits. A system to perform the method and a product marked accordingly are also described.

20 Claims, 2 Drawing Sheets

MARKING SYSTEM AND METHOD

Figure 1:
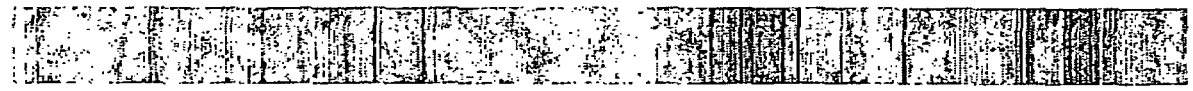

This is a nationalization of PCT/GB04/001554 filed Apr. 13, 2004 and published in English.

The invention relates to a marking system and method to facilitate the identification, authentication and quality control of packaged products, particularly but not restricted to food and food products and other similar organic products of complex composition. The invention is also a packaged product carrying such a marking for use in such a system and/or in accordance with such a method.

The invention relates to packaged products which are typically placed in containers (which term is intended to encompass containers of any suitable type) at a manufacturing or distribution centre for onward shipping to a remote site for use, storage, consumption, sale etc.

There is a well understood general desire to be able to monitor and track such a product at stages in the fabrication and distribution process, particularly where this is a food or food product, other product intended for human or animal consumption, or other product where close monitoring of the chemical composition and/or transit/storage conditions might be critical.

For some purposes, it might be sufficient that the product is identified, for example on the packaging or accompanying paperwork, and associated instructions are given regarding necessary conditions for storage and transit, degradation times and shelf life, etc. A more sophisticated system is proposed in FR2787220, where an identification tag is applied to the product packaging which incorporates details of environmental transit or storage parameters, together with sensors of the same, and is able to identify when the product has been kept in unsatisfactory conditions. However, even a system such as this does not, directly, monitor the condition of the product itself. In order to do this, the need might arise for subsequent monitoring of product, for example by testing of samples from a batch of packaged product at a point down the distribution line.

Such a need might arise for example for authentication purposes, for example to check that a product is original (or at least is of original quality, and not an inferior counterfeit) in the case of branded products, products of protected denomination of origin and the like; or quality control to ensure that a product meets a quality, safety or other composition specification standard; or to check and detect whether a product has been adulterated; or to check and monitor degradation of quality over time, by ensuring composition remains within a predetermined satisfactory range; or for various other purposes.

Various analytical techniques exist to determine the overall chemical composition and/or the concentrations of particular target chemical species in such a product. It is possible to carry out such analysis on representative samples taken from a batch of previously packaged products, and to make a comparison either with standard reference or predetermined specification data or with data collected from that batch of product prior to packaging. An assessment can be made then of whether the composition of a sampled product meets such predetermined parameters for the purposes discussed above. This requires careful maintenance of a paper trail or other data record referring back to the point of packaging to ensure that subsequent batch sampling is matched with data relating to the product at packaging, which for complex production and distribution networks can become cumbersome, inefficient and slow.

There is a general desire to provide an authentication system for identification, authentication and quality control of packaged products, which can be carried out by reference to batches of packaged products themselves without the need for such complex cross-referencing.

It has been suggested that some of the paper trail involved in tracking product can be reduced if contents information is provided on the packaging. DE4436923 describes such a system for the transport of bulk chemicals, in which a product is analysed at the manufacturing/distribution point to within suitable purity parameters for example, and this information is incorporated into a simple black and white bar code. This may be encoded to give an authentication system and offers the possibility for customs sampling and further authentication at the distribution point, so as to simplify matters in transit. The code can also serve as a product identifier at the onward distribution point, for example ensuring that a bulk tanker delivers its load to the correct bulk storage facility.

This concept is very much directed to bulk transport and storage, and provides a system which is primarily intended for use in circumstances where is can be assumed that the product does not undergo changes in terms of quality during storage or transit, and where interference with a product in transit is unlikely to be an issue. The simple bar code is sufficient for this identification and authentication role, but provides only limited information about the product.

None of the prior art systems are satisfactory for packaged products where degradation over time, purity control based on batch sampling, authentication, and safeguarding against tampering, are all concerns, such as is particularly the case for the transport of food, medicines and like items, in small packaging units packaged and transported in large batches from an individual packaging point. It is an object of the invention to provide a methodology and system to facilitate the identification, authentication or quality control of such packaged products in a simple and self-contained manner and which mitigates some or all the disadvantages of the above systems.

Thus, in accordance with the present invention in a first aspect in its most comprehensive concept the invention comprises a methodology for facilitating the identification, authentication or quality control of packaged products, which methodology comprises:

in a first marking phase:
obtaining data representative of an analytical specification of a chemical composition for the product;
processing and recording the data on a machine readable data storage means provided in association with the packaged product, in particular in direct mechanical association with the packaging thereof, and for example being incorporated into or onto or as a part of such packaging;

and in a second authentication phase:
applying a suitable data reader to the data storage means to read the recorded data and reconstruct the recorded analytical specification;
chemically analysing a sample of the product to obtain data representative of an analytical specification of the chemical composition for the product;
comparing the results of the said analysis with the reconstructed recorded analytical specification within predetermined tolerance limits.

Making this comparison allows an assessment to be made of measured analytical data from a sample taken from a packaged product against reference data contained in or on or in direct association with the package. The reference data represents at least an analytical specification of a predetermined desired composition of the product, recorded in direct association with the packaging at the point of packaging, and against which the subsequently measured analytical specification can be compared. It is not necessary to refer back in any way to other sources of information. A rapid assessment of whether the composition of the packaged product is within tolerance limits of a desired composition range can be made, for example to check its authenticity, to check its quality, to ensure it has not been adulterated or has otherwise degraded etc., can be carried out with reference to the packaged product alone. A simple, rapid and automatic screening system for such products is therefore provided.

The key to the invention is that what is recorded at the marking phase comprises a substantially full analytical specification, which is then recorded on the packaging in a manner which enables it to be reconstructed at the authentication phase. The analytical specification does not merely constitute selected data points relating for example to characteristic peaks in an analysis. Rather, an analytical technique is used which obtains varying intensity data across a spectrum or other range, with the intensity distribution across the spectrum or range being characteristic of the chemical composition of the product. In accordance with the invention, reference is made to the recordal of such an analytical specification, by which is meant a recordal of distributed intensity data across the range, rather than merely a recordal of data about the presence of particular characteristic peaks or the like.

It is this recordal of an analytical specification of varying intensity information across the spectral or other analytical range that is the key to the invention. By recording such a specification in a machine readable manner on the packaging, it is possible to reconstruct at a remote site, purely from the recordal on the packaging, the analytical specification representative of the contents of the packaging. This can be compared with a corresponding analytical specification (either generated using the same technique, or by using another technique and making suitable conversion to allow for such comparison) within predetermined tolerance limits to compare the actual and expected composition and assess authenticity, monitor degradation etc.

The machine readable recorded data comprises an indication of an expected result for the subsequent chemical analysis step. If this expected result corresponds, within predetermined tolerance limits, to the measured result when a sample is subsequently taken, a batch so tested may be passed. If the comparison reveals that the measured result is outside such tolerance limits, the batch may be rejected and/or passed on for more detailed analysis or other further processing.

It will be apparent that this reference data could be obtained in a number of ways. Reference data might be representative of established composition or specifications. Reference data might include compositional information obtained from periodic testing of the product to be packaged. This may be irregular representative testing, or specific testing of each batch, such that the recorded reference data corresponds to an analytical specification particular to the product within a particular package. Reference data may include combinations of the foregoing. The reference data includes at least an analytical specification as described representative of a predetermined desired composition which can be reconstructed for comparison with a subsequent measured analytical specification obtained as above, and may include further information.

In a particular preferred embodiment the reference data is obtained by testing of a representative sample for each product or batch of products at the time of packaging. Thus, in the preferred embodiment, the marking phase of the methodology is modified to comprise the step of analysing a sample of the product, prior to or during packaging, to obtain reference representative at least of an analytical specification of the sampled composition, and thus indicative of a predetermined desired chemical composition for the batch of product, and the step of processing and recording the data on a machine readable data storage means provided in direct mechanical association with each product or unit of the batch of packaged product. In other words, the package is marked with a predetermined desired chemical composition based upon specific sampling of the actual chemical composition of the product or a sample thereof at the point of packaging and on the analytical specification generated thereby.

It follows that the authentication phase of the methodology is preferably modified to comprise the step of repeating the chemical analysis of the above marking phase to obtain data representative of an analytic specification of the actual chemical composition for the product. The comparison step then involves reading and reconstructing the first analytical specification, corresponding to that measured by sampling at the point of packaging and deemed to be the desired specification, and comparing this with the second measured specification at the point of testing within predetermined tolerance limits.

It will be understood that the overall methodology includes a marking phase and an authentication phase which are likely to be carried out remotely from each other in space and time, and independently. Accordingly, the invention in a further aspect comprises a marking method to facilitate the identification authentication or quality control of packaged products, and in a yet further aspect comprises an authentication method for the identification, authentication or quality control of packaged products marked in accordance with the foregoing, the respective aspects of the invention comprising the marking phase and authentication phase as above described performed independently.

The analysis method comprises any known method of chemical analysis suitable for obtaining data representative of the composition, or aspects thereof, of the product in question. Particularly preferred are analysis methods which generate data that can be easily processed and stored in a suitably reconstructable form. It is desirable for the analysis method to be repeatable, and to be relatively independent of test conditions, to ensure consistency of results regardless of where the test is performed, and hence accuracy of comparison of measured analysis data with recorded reference data when the analysis step is carried out by a number of different users at a number of remote sites.

It will be understood that a necessary feature of the analysis method is that it gives a two dimensional data response, in the sense that variable intensity data can be referenced against a test parameter across a range of values. It is this two dimensional specification which is recorded on the packaging and can then be reconstructed for the comparison phase. It is will of course be understood that references to reconstructing this specification do not imply the need for any real physical reconstruction of a representation of the specification, but merely imply that the data is made available by the data reader, for example through suitable comparison software, to be compared with a corresponding measured specification at the test phase.

In a preferred embodiment, the analysis method comprises a method of obtaining a spectrum representative of the chemical composition of the product, wherein intensity data varies across a range of frequencies.

In a preferred embodiment, nuclear magnetic resonance is used for the analysis step during the authentication phase. More preferably, nuclear magnetic resonance is also used to provide an analysis of the sample to create reference data during the marking phase. However, it will be understood that any other suitable technique which produces the necessary map of quantifiable variable intensity data functionally related to compositional data could be considered, including without limitation mass spectroscopy, UV spectroscopy and the like.

The invention relies on the creation of reference data that is then recorded in machine readable form in direct association with the packaging. Moreover, the reference data is not merely a limited and arbitrary set of discrete items of characteristic data. Rather, the reference data comprises data from which a substantive analytical specification, for example in the form of an analytical spectrum or other range map with variable intensity information, can be reconstructed. In accordance with the invention reference data includes at least one such two-dimensional analytical specification with mapped intensity data.

In the preferred embodiment, this reference data is obtained by batch analysis of the product to be packaged, for example during manufacture or otherwise prior to or during packaging. The reference data may optionally further include additional compositional or other data derived from standards, reference specifications, predetermined tolerance parameters and the like.

The reference data produced by this analysis step and/or obtained otherwise from reference or specification sources is collected and processed to convert raw chemical composition data into a recordable, readable and processable form. This includes at least the conversion of an analytical specification as hereinbefore defined into a recordable, readable and reconstructable form.

In particular, this stage might be carried out under the control of suitable computer software or a suitably programmed computer, for example comprising the steps of collecting raw analysis data and/or reference data from reference or specification sources, digitizing the data, transferring the digitized data to the input of a suitable data processor, processing the data as described and outputting the processed data in a form suitable to be recorded on the data storage means and/or to provide a set of instructions for the fabrication of a data storage means such that the data is readable thereon.

The data storage means serves as a record of the reference data. It provides a machine readable digital data source in direct association with the packaged product to avoid the need for an extensive paper trail and to ensure that a simple testing and screening process can be carried out with reference to the packaged product alone and without reference to extraneous information sources.

A range of potentially suitable data storage means will suggest themselves, and will include optically, electronically and magnetically readable devices and/or areas on or comprised as part of the packaging. Suitable reference data storage means might include magnetic strips, smart chips etc., and optically readable areas, in particular in a preferred embodiment comprising optical areas of light and dark markings and/or colour and/or grey shade markings in one or two dimensions, such as bar codes or the like.

Precise details of the data storage system are not pertinent to the invention, the principal requirement being that the data storage system is capable of storing an analytical specification as hereinbefore defined in a form which allows the specification to be reconstructed at a subsequent test phase with sufficient resolution to allow for effective comparison. Within this general resolution requirement, the data storage means may store the analytical specification data in analogue or digital form in any suitable readable manner.

For many applications, optionally readable markings such as bar codes will be particularly preferred. Bar codes and bar code readers are familiar in relation to packaged food and similar products, which should facilitate use of the system in accordance with the invention. However, conventional bar code readers deal primarily with simple black and white optical coding systems. Such systems might enable storage of some simple compositional data, for example relating to certain set composition parameters, or to a small number of pre-selected peak intensities from an analytic spectrum, but will not lend themselves to the recordal of fully reproducible analytical specifications, which is the essence of the present invention. Accordingly, the optically readable markings such as a bar code which is intended to be used in accordance with the invention will preferably be a graduated scale marking, wherein data is stored not merely by the presence or absence of a mark in a predetermined region within the marking, but by the position and also by the intensity, shade, tone, colour, hue etc. In particular, the marking is an optically readable grey-scale marking in which the degree of grey shading also carries information.

Such markings lend themselves particularly to the representation of an analytical specification as defined in accordance with the invention. The analytical specification comprises intensity data mapped across a measured range, for example an intensity spectrum mapped against frequency. Such an analytical specification transfer readily on to a simple linear optical marking, for example in that position on the marking corresponds functionally to frequency or the like, and in that the shading, tone, colour, hue etc. of the marking at that position corresponds functionally to intensity at that point in the range. In relation to the preferred analysis method using a NMR spectrum, data transfers particularly effectively to a linear grey-scale bar code, which is accordingly especially preferred.

A single linear bar code or other optically readable structure may be used. Alternatively, a plurality of bar codes or other structures may be provided for example to give measurement of different compositional aspects and/or of expected compositions varying with time in store, to give a representation of shelf life or similar. More complex optically readable structures, for example comprising multiple sub-structures and/or having two-dimensional extent can be considered to give more information.

The reference data may be stored on the data storage means in directly readable form, or in an encrypted or otherwise secure form.

In the authentication phase, the reference data is read by a suitable reader, which depending on the data storage means might include a magnetic strip scanner, a smart chip reader, an optical data reader such as a bar code reader or the like. As has been noted, optical readers such as bar code readers are particularly preferred, being simple and effective, and being systems which are already familiar in relation to packaged products of this type. However, it will be understood that simple black and white bar codes are unlikely to be suitable for the invention and that the graduated scale bar codes which will be preferred will need suitably modified readers.

An analysis step is carried out using a suitable chemical analysis method, such as NMR to generate a measured analytical specification. The reference data has been created with the intention of being referable to this analysis step, and in particular has been created by the previous carrying out of an equivalent analysis step on a sample of the packaged product to generate an equivalent analytical specification. A comparison is then made of the results of the analysis to the predetermined reference data specification within predetermined tolerances. This comparison step in particular is carried out automatically by an analysis system, for example by passing analysis data for the measured specification to a comparator, which conveniently comprises the processor of a suitably programmed computer, reconstructing the reference specification making the comparison, and outputting the results in an operator readable form. In an optional further step, the result is displayed, for example by visual and/or audio visual display means.

Comparison is made within predetermined tolerance limits, for example to judge quality or acceptability on a pass/fail basis. These tolerance limits may be stored as part of the reference data, may be pre-recorded within the comparator, or may be input by or otherwise applied by a user at the comparison stage. In addition to a reference analytical specification the reference data may include a series of tolerance limits and/or a plurality of reference composition ranges corresponding for example to different levels of product degradation, so that the system can give an indication of shelf life or similar.

In accordance with a further aspect of the invention a system for the identification, authentication and quality control of packaged products comprises:

a machine readable data storage means provided in association with the packaged product, in particular in direct mechanical association with the packaging thereof, and for example being incorporated into or onto or as a part of such packaging;

a marking device for processing data representative of an analytical specification of a chemical composition for the product and recording the data on the data storage means in readable form;

an authentication device comprising a suitable data reader to read the recorded data on the data storage means and reconstruct the analytical specification;

a chemical analyzer to perform a subsequent analysis of a sample of the product to obtain data representative of an analytical specification of the actual chemical composition for the product;

a means to compare the results of the said analysis with the recorded specification within predetermined tolerance limits.

As before, it will be understood that the marking and authentication processes are likely to be carried out remotely from each other in space and time, and independently. Accordingly, the invention in a further aspect comprises a marking system as above described to facilitate the identification authentication or quality control of packaged products, and in a yet further aspect comprises an authentication system as above described for the identification, authentication or quality control of packaged products marked in accordance with the foregoing.

Preferably, the marking system will be provided in association with a chemical analyzer, conveniently to carry out an identical analysis to that carried out by the authentication system, to analyse a sample of the product to obtain the said analytical specification for the product prior to or during packaging, and data processing means to collect and process the data and convert to a reference mark for application by the marking system.

Optionally, the authentication system includes display means to display a result to a user. This may take the form of an alphanumeric display, coloured lights, sounds and alarms etc. in any suitable combination. Since the system is primarily intended as a screen it will often be sufficient that the display is adapted to display one of a small number of discreet results, and in particular to display a pass/fail result.

In accordance with a further aspect of the invention, a marked packaged product to facilitate identification, authentication and quality control of the contents thereof comprises a product retained within a container and having in direct physical association with the container and for example on or comprising a part thereof, a machine readable reference mark incorporating pre-recorded data comprising a reconstructable analytical specification indicative of the expected chemical composition of the product, and in particular pre-recorded data relating to a reconstructable analytical specification of the chemical composition of a batch sample associated with the product.

The invention is applicable to any contained chemical product where there might be a desire to track composition and detect changes in composition for any of the reasons set out herein above, for example in relation to concerns about authenticity, maintenance of quality specifications, adulteration, degradation over time etc. The invention is particularly applicable to food, food products and the like. It is also suited to other products for human or animal consumption or use where similar safety issues arise, such as pharmaceutical and cosmetic products. It is also suited for use with other products where similar quality control and specification issues arise, such as fine chemical and agrochemical liquids.

References herein above to packaged products cover any such products when placed in any suitable containers for onward distribution or storage and the like, including consumer products in bottles, cartons, jars, packets, sachets etc., and contained products contained for storage or shipping on a larger scales in barrels, vats, tanks etc.

In all such cases, the present invention provides a convenient and effective means to batch sample and screen remotely distributed or stored packaged products themselves by virtue of information stored in direct association with the packaged product and without requiring reference to any extraneous information sources.

Figure 2:
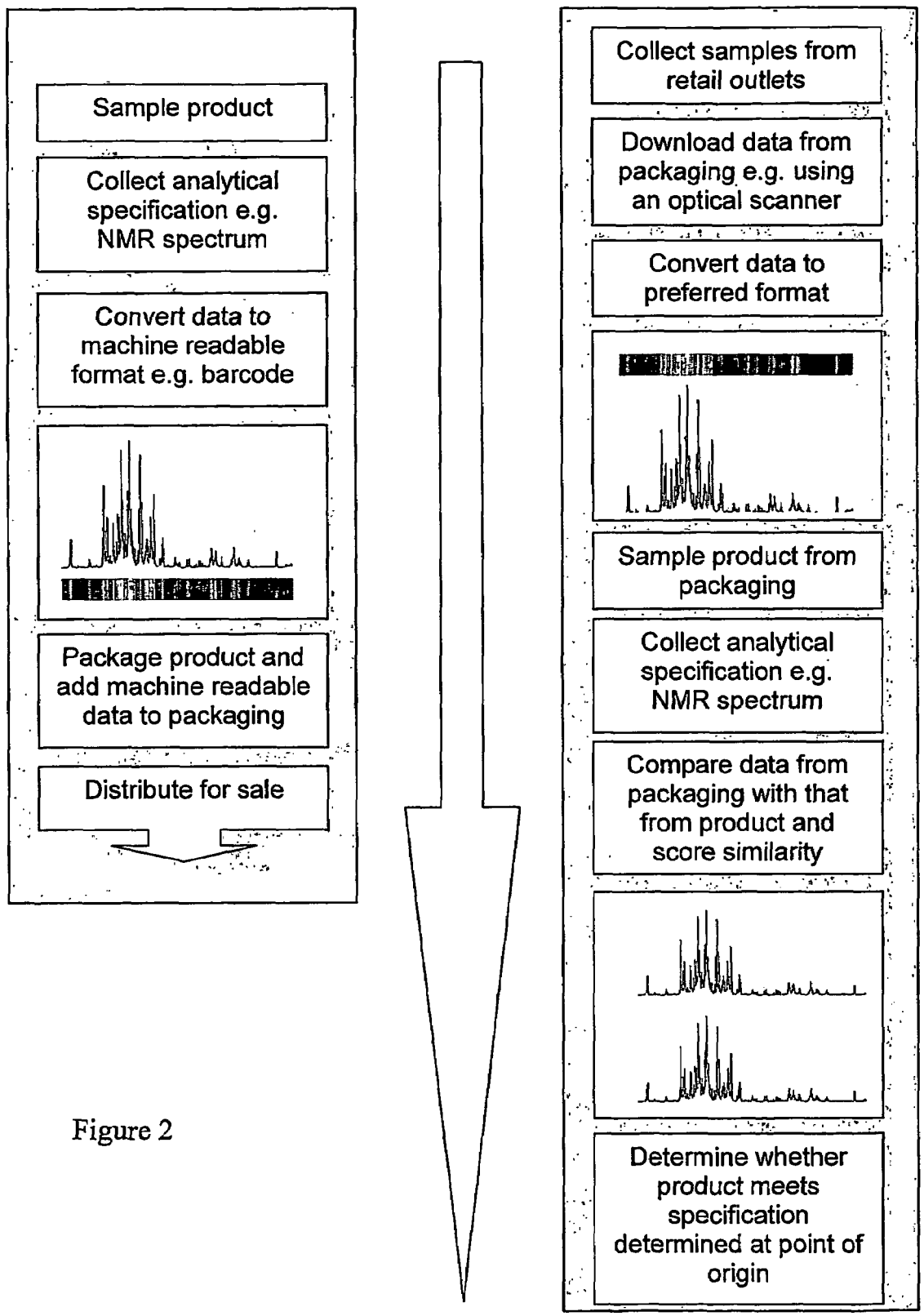

The invention will now be described by way of example only with reference to FIGS. 1 to 2 of the accompanying drawing, wherein FIG. 1 illustrates an example of a bar code marking suitable to be incorporated into the packaging of a packaged product to put the foregoing invention into practice;

FIG. 2 is a flow-chart representation of an embodiment of the process of the invention, employing a bar code marking as illustrated in FIG. 1.

FIG. 1 illustrates an NMR bar code generated as a greyscale projection of a 1D 1 H NMR spectrum. The depth of colour is directly proportional to the peak intensities of the NMR spectrum, so by scanning the bar code the NMR spectrum can easily be reconstituted. The NMR bar code is representative of reference data for the product, and is most conveniently obtained by NMR analysis of a sample of product before or during packaging, using conventional NMR apparatus.

By associating this bar code with a target product, such as a protected denomination of origin or branded product, perhaps as part of the packaging, it would be relatively straightforward to confirm that what is in the packet produces the same NMR profile as that defined by this bar code. This can be done by repeating the NMR analysis of a sample of packaged product using conventional NMR apparatus for example at a remote site.

The actual result is compared with the expected result provided by the bar code in direct association with the product to ensure correspondence within reasonable tolerances. It becomes possible simply and quickly and without external reference for example to check that a product is original (or at least is of original quality), to ensure that a product meets a quality, safety or other composition specification standard or to check and detect whether a product has been adulterated.

Another possible use is to confirm the age of a product. Multiple NMR spectra of a perishable product can easily be stored as a bar code with a similar depth as the one above. By matching the profile of the product inside the packaging to a time course of expected profiles from a particular product it should be possible to estimate the approximate age of the product.

FIG. 2 illustrates a possible embodiment of the process in greater detail. The figure shows a flow diagram illustrating the processes that are required to realize an embodiment of the invention.

The left hand side of FIG. 2 illustrates the process that will occur at the point of origin for a particular product. Initial batch sampling will involve removing a number of aliquots of the product directly from the production line immediately prior to packaging the product. The number of aliquots that are taken will be sufficient to describe the natural range of variation in the chemical specification of the product. This will be determined by previous homogeneity testing of the batch production process to ensure that the specification derived for a particular product is wholly representative of the matrix under investigation.

The product will then be subjected to chemical analysis. In the example given in FIG. 2, nuclear magnetic resonance spectroscopy is used to generate the chemical specification. The chemical specification of the product is defined by compositional characteristics of the product for which a specification is to be determined e.g. the concentration of the compounds that are present in the product. Further, the chemical specification will be converted into a machine-readable format.

The example in FIG. 2 is that of a greyscale barcode such as is illustrated in FIG. 1. This has been calculated using a quadratic function in which the shade at an individual position within the barcode is calculated from the intensity of the data representing the analytical specification. The example clearly demonstrates the correlation between the NMR spectral intensity and the shading in the barcode. The more intense NMR resonances are depicted as light shades or white and the low intensity NMR resonances are depicted as dark grey or black. The quadratic function used to calculate the precise shade of the barcode has been determined to give good contract using the range of intensities present in the NMR data.

Once the machine-readable product specification (e.g. barcode) has been constructed. it is incorporated within the packaging of the product. This is positioned such that it cannot be changed without evidence of tampering (e.g. on the reverse of a product label), and also is in such a position as to be accessible without the need to remove the product from its packaging. The product can be packaged and distributed in the normal fashion.

The second stage of the process described herein will be performed after a product has been released from its point of origin, and is illustrated on the right of the figure. The aim of the second stage of the process is to determine whether a product meets the specification determined at the point of origin. Reasons for this not being the case may include substitution of a product with inferior goods and duplication of original packaging material, or mistreatment resulting in premature aging of the product. Initially, the whole packaged produce will be retrieved, possibly from a retail outlet, depot or whilst in transit. The product specification is then retrieved from the packing using an automatic data-reading device. This device will convert the product specification stored on the packaging of the product into a form that will enable reconstruction of the original chemical specification of the product determined at the point of origin for that product. Using the example given in FIG. 2, an optical reader, such as an infra-red scanner can be used to electronically reconstruct the barcode that is attached to the product.

Once the product specification has been read from the packaging, the original chemical specification (e.g. the NMR data) can be reconstructed by applying the inverse quadratic function to that which was applied to the chemical specification to convert it into machine-readable format, to the machine-readable data.

The product is then removed from the packaging. Aliquots of the product are taken and these are subjected to the same analysis that was performed when the product was originally packaged. The data derived from this analysis is then compared to that obtained from the packaging. Suitable algorithms (e.g. Pearson's correlation coefficient) are used to generate a similarity score to determine the likelihood that the product contained within the packaging meets the specification defined on the package. Using predefined limits of acceptance or rejection, the product is accepted as meeting the specification defined at the point of origin, or rejected as failing to meet the specification defined at the point of origin.

I claim:

1. A method for facilitating the identification, authentication or quality control of packaged products, which methodology comprises:

in a first marking phase:
    obtaining data representative of an analytical specification of a chemical composition for the product;
    processing and recording the data on a machine readable data storage means provided in direct mechanical association with the packaged product;
and in a second authentication phase:
    applying a suitable data reader to the data storage means to read the recorded data and reconstruct the recorded analytical specification;
    chemically analysing a sample of the product to obtain data representative of an analytical specification of the actual chemical composition for the product;
    comparing the results of the said analysis with the recorded readings within predetermined tolerance limits to determine whether the packaged product meets the recorded analytical specification so as to identify, authenticate, or achieve quality control over, the packaged product.

2. A method in accordance with claim 1 wherein the data storage means is incorporated into or onto or as a part of the packaging.

3. A method in accordance with claim 1 wherein the same analysis method is used to generate a reference analytical specification to create reference data during the marking phase and to generate a measured analytical specification during the authentication phase.

4. A method in accordance with claim 1 wherein reference data is recorded further including additional compositional data derived from standards, reference specifications, predetermined tolerance parameters and the like.

5. A method in accordance with claim 1 comprising the marking phase being performed independently of the authentication phase.

6. A method in accordance with claim 1 comprising the authentication phase being performed independently of the marking phase.

7. A method in accordance with claim 1 wherein an analytical specification is generated by an analysis method comprising a method of obtaining a spectrum representative of the chemical composition of the product, wherein intensity data varies across a range of frequencies.

8. A method in accordance with claim 7 wherein an analytical spectrum is generated by nuclear magnetic resonance.

9. A method in accordance with claim 1 wherein the analytical spectrum is obtained by batch analysis of the product to be packaged, for example during manufacture or otherwise prior to or during packaging.

10. A method in accordance with claim 9 wherein the analytical spectrum is obtained by testing of a representative sample for each product or batch of products at the time of packaging, the marking phase of the methodology thus comprising the step of analysing a sample of the product, prior to or during packaging, to obtain data representative of at least of an analytical specification of the sampled composition, and thus indicative of a predetermined desired chemical composition for the batch of product, and the step of processing and recording the data on a machine readable data storage means provided in direct mechanical association with each product or unit of the batch of packaged product.

11. A method in accordance with claim 1 wherein the analytical specification comprises a two-dimensional range map of variable intensity information referenced against a test parameter across a range of values.

12. A method in accordance with claim 11 wherein the analytical specification comprises an analytical spectrum of variable intensity information referenced across a frequency range.

13. A method in accordance with claim 12 wherein the authentication phase of the methodology is modified to comprise the step of repeating the chemical analysis of the above marking phase to obtain data representative of an analytical specification of the actual chemical composition for the product.

14. A method in accordance with claim 1 wherein the data storage means comprise optically, electronically and magnetically readable devices and/or areas on or comprised as part of the packaging.

15. A method in accordance with claim 14 wherein the data is stored on data storage means comprising optically readable areas having a graduated scale such that data is stored by the position and also by the intensity, shade, tone, colour, hue or the like of an optically readable mark.

16. A method in accordance with claim 15 wherein the analytical specification comprises intensity data mapped across a measured analytical range, and is recorded such that position on the marking corresponds to the range, and in that the shading, tone, colour, hue or the like corresponds to intensity.

17. A method in accordance with claim 15 wherein the data storage means comprises an optically readable grey-scale marking.

18. A system for the identification, authentication and quality control of packaged products comprising:
   a marking system comprising:
   a machine readable data storage means provided in direct mechanical association with the packaged product, in particular being incorporated into or onto or as a part of such packaging; and
   a marking device for processing data representative of an analytical specification of a chemical composition for the product and recording the data on the data storage means in readable form;
   an authentication system comprising:
   an authentication device comprising a suitable data reader to read the recorded data on the data storage means and reconstruct the analytical specification; and
   a chemical analyzer to perform a subsequent analysis of a sample of the product to obtain data representative of aspects of the actual chemical composition for the product; and
   a means to compare the results of the said analysis with the recorded specification within predetermined tolerance limits to determine whether the packaged product meets the recorded analytical specification so as to identify, authenticate, or achieve quality control over, the packaged product.

19. A system in accordance with claim 18 wherein the marking system is provided in association with a chemical analyzer adapted to carry out an identical analysis to that carried out by the authentication system, to analyse a sample of the product to obtain the said analytical specification prior to or during packaging, and data processing means to collect and process the data and convert to a reference mark for application by the marking system.

20. A system in accordance with claim 18 wherein the authentication system includes display means to display a result to a user.

* * * * *